(12) United States Patent
Fukasaku et al.

(10) Patent No.: US 7,498,545 B2
(45) Date of Patent: Mar. 3, 2009

(54) ELECTRIC MOTOR CONTROLLER IN ELECTRIC COMPRESSOR

(75) Inventors: Hiroshi Fukasaku, Kariya (JP); Kazuki Najima, Kariya (JP); Takashi Kawashima, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 106 days.

(21) Appl. No.: 11/414,071

(22) Filed: Apr. 27, 2006

(65) Prior Publication Data

US 2006/0247827 A1 Nov. 2, 2006

(30) Foreign Application Priority Data

Apr. 27, 2005 (JP) ............................. 2005-130388

(51) Int. Cl.
*H05B 1/02* (2006.01)
(52) U.S. Cl. ........................ 219/497; 219/481; 219/494; 62/196.2; 62/228.3
(58) Field of Classification Search ................. 219/496, 219/497, 505, 501, 481, 507, 508, 490–494; 62/228.3, 228.4, 228.5, 196.2, 225
See application file for complete search history.

(56) References Cited

U.S. PATENT DOCUMENTS 4,995,240 A * 2/1991 Barthel et al. .................. 62/225
5,689,963 A * 11/1997 Bahel et al. .................... 62/129
6,321,550 B1 * 11/2001 Chopko et al. ............. 62/228.3
7,134,290 B2 * 11/2006 Awwad et al. ......... 318/400.09

FOREIGN PATENT DOCUMENTS

| JP | 62-129586 | 6/1987 |
|---|---|---|
| JP | 7-115791 | 5/1995 |
| JP | 2001-241787 | 9/2001 |
| JP | 2001-280259 | 10/2001 |
| JP | 2003-003981 | 1/2003 |

* cited by examiner

*Primary Examiner*—Mark H Paschall
(74) *Attorney, Agent, or Firm*—Woodcock Washburn LLP

(57) ABSTRACT

A coil of an electric motor is cooled by refrigerant. A controller for the electric motor controls a current supplied to the coil within a range less than or equal to a predetermined maximum value. A temperature detection section detects either a temperature of the coil or a temperature about the coil. When a detection temperature that is detected by the temperature detection section prior to activation of the electric motor reaches a predetermined reference temperature, a limiting section executes a limiting control to limit an upper limit value of the current supplied to the coil to a limiting value that is less than the maximum value. Accordingly, the coil of the electric motor is protected without stopping the operation of the electric compressor immediately after activation.

5 Claims, 5 Drawing Sheets

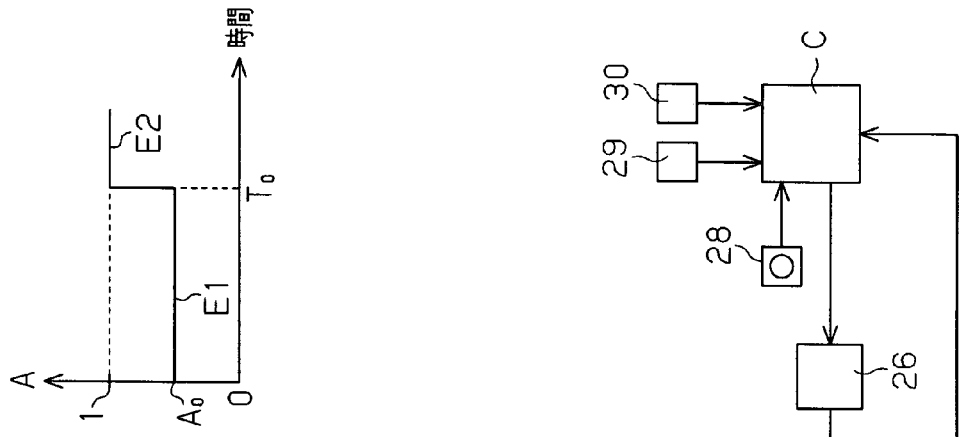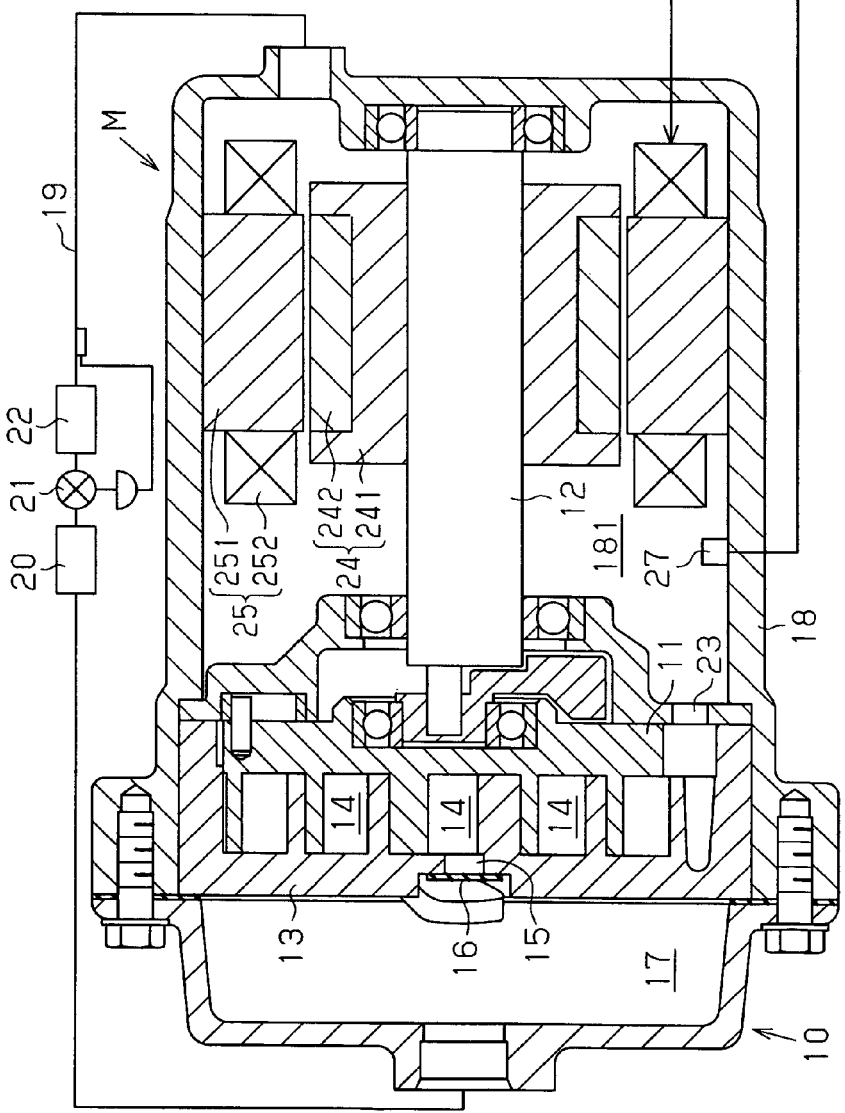

ELECTRIC MOTOR CONTROLLER IN ELECTRIC COMPRESSOR

CROSS REFERENCE TO RELATED APPLICATIONS

This application claims priority to Japanese application no. 2005-130388 filed Apr. 27, 2005.

BACKGROUND OF THE INVENTION

The present invention relates to an electric motor controller in an electric compressor. Specifically, the present invention relates to an electric motor controller installed in an electric compressor that compresses and discharges refrigerant in a compression chamber by compressing action of a compression member based on rotation of a rotary shaft rotated by the electric motor, and cools coils of the electric motor with the refrigerant.

To protect coils of the electric motor in an electric compressor from electrical breakdown due to overheating, a measure has been proposed in which the electric compressor is stopped before the coils are overheated. Japanese Laid-Open Patent Publication No. 2001-280259 discloses a compressor that includes a first temperature detection section for detecting the temperature of the coils of an electric motor and a second temperature detection section for detecting a temperature lower than the detection temperature of the first temperature detection section. When the temperature of the coils reaches the detection temperature of the second temperature detection section, the compressor is operated to increase its displacement. When the temperature of the coils surpasses the detection temperature of the first temperature detection section, the compressor is stopped.

However, if the electric compressor is stopped, the flow of refrigerant is stopped. This reduces the rate of decrease in the temperature of the coils, and thus extends the stopping period of the electric compressor. Therefore, the control, which stops the electric compressor, is not preferable.

When an electric compressor is activated, a control for maximizing the displacement (maximum load operation) is normally performed. For a certain time after the activation, the amount of refrigerant circulation for cooling the coils is not sufficient. Therefore, if the ambient temperature is high when the electric compressor is activated, since the maximum load operation supplies a current of a maximum current value to the coils, the temperature of the coils are raised before coolant lowers the coil temperature. As a result, the coil temperature reaches a stop Temperature set for preventing overheating after a short period from the activation. This stops the electric compressor.

SUMMARY OF THE INVENTION

Accordingly, it is an objective of the present invention to provide an electric motor controller that is capable of protecting the coil of an electric motor without stopping the operation of an electric compressor immediately after activation.

According to an aspect of the present invention, a controller for an electric motor in an electric compressor is provided. The compressor includes a rotary shaft that is rotated by the electric motor and a compressing member that, based on rotation of the rotary shaft, compresses and discharges refrigerant in a compression chamber. A coil of the electric motor is cooled by the refrigerant. The controller controls a current supplied to the coil within a range less than or equal to a predetermined maximum value. The controller includes a temperature detection section detecting either a temperature of the coil or a temperature about the coil. When a detection temperature detected by the temperature detection section prior to activation of the electric motor reaches a predetermined reference temperature, a limiting section executes a limiting control to limit an upper limit value of the current supplied to the coil to a limiting value that is less than the maximum value.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1A is a side cross-sectional view illustrating an entire scroll compressor according to a first embodiment of the present invention;

FIG. 1B is a graph for explaining a limiting control executed by the electric motor controller shown in FIG. 1A;

DETAILED DESCRIPTION OF ILLUSTRATIVE EMBODIMENTS

Figure 2:
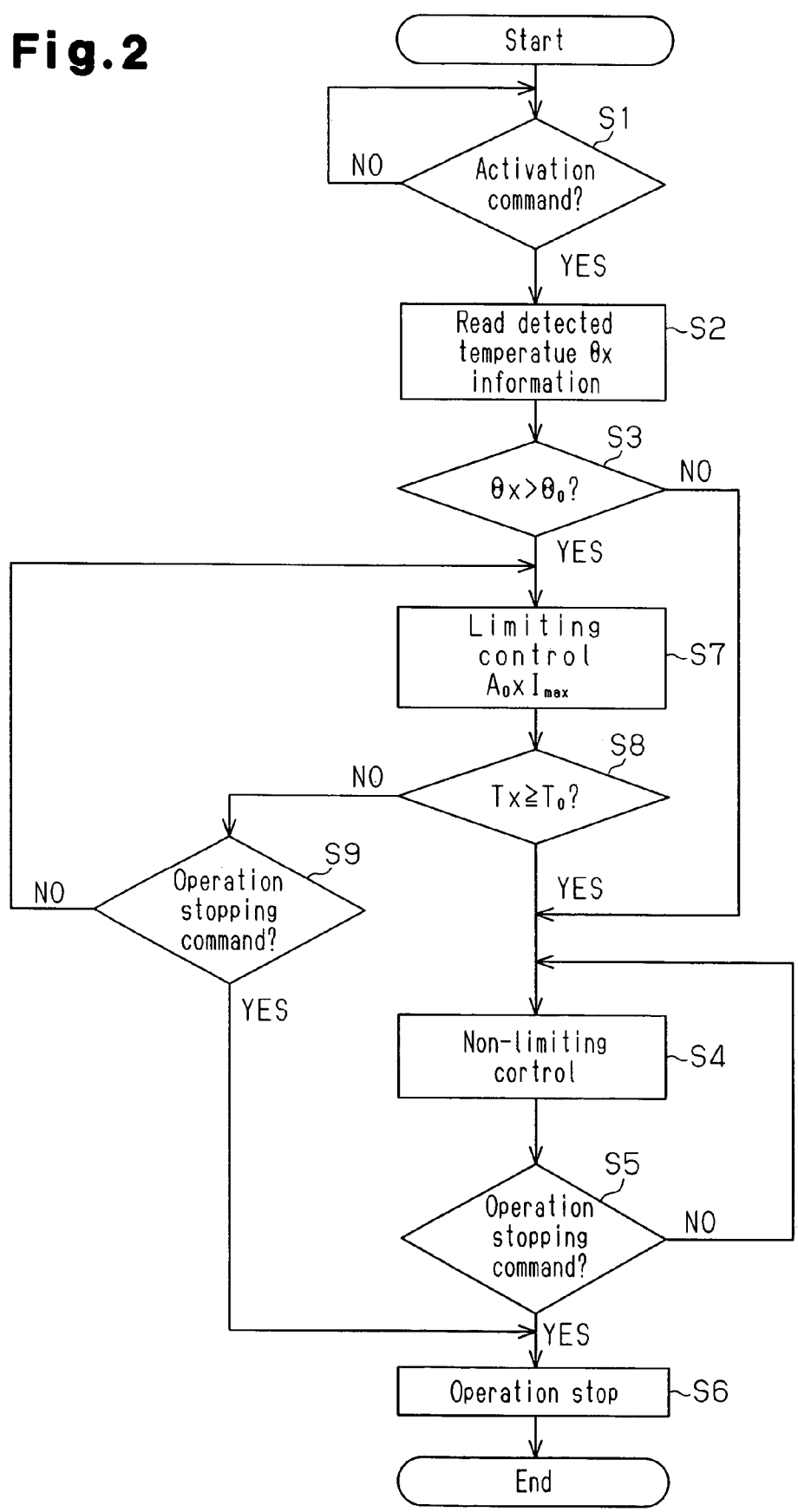
FIG. 2 is a flowchart showing a program for controlling current supply to the electric motor executed by the electric motor controller of FIG. 1A.

A first embodiment of the present invention will now be described with reference to FIGS. 1A, 1B, and 2.

As shown in FIG. 1A, an electric compressor, which is an electric scroll compressor 10, includes an orbiting scroll 11, which orbits as an electric motor M rotates a rotary shaft 12. Accordingly, the volume of compression chambers 14 between the orbiting scroll 11 functioning as a compressing member and a fixed scroll 13 is reduced. Refrigerant in each compression chamber 14 is discharged to a discharge chamber 17 through a discharge port 15 while flexing a discharge valve flap 16.

The discharge chamber 17 is connected to a suction chamber 181 in a motor housing 18 by an external refrigerant circuit 19. A heat exchanger 20 for drawing heat from refrigerant, an expansion valve 21, and a heat exchanger 22 for transferring the ambient heat to refrigerant are located on the external refrigerant circuit 19. Refrigerant in the discharge chamber 17 flows out to the external refrigerant circuit 19, and then returns to the suction chamber 181. Refrigerant conducted into the suction chamber 181 is drawn into the compression chambers 14 through a suction port 23.

A rotor 24 of the electric motor M is attached to the rotary shaft 12, and a stator 25 of the electric motor M is fixed to the inner circumferential surface of the motor housing 18. The rotor 24 includes a rotor core 241 attached to the rotary shaft 12 and permanent magnets 242 provided on the circumferential surface of the rotor core 241. The permanent magnets 242 are arranged such-that each adjacent pair along the circumferential direction of the rotor core 241 have different magnetic poles facing the stator 25.

The stator 25 of the electric motor M includes an annular stator core 251 and a coil 252 wound about the stator core 251. The rotor 24 rotates when electricity is supplied to the coil 252, and the rotary shaft 12 rotates integrally with the rotor 24. Electricity is supplied to the coil 252 by an inverter 26.

A temperature detector 27 is located inside the motor housing 18. The temperature detector 27 detects the temperature about the coil 252. Temperature information detected by the temperature detector 27, which functions as a temperature detection section, is sent to a control computer C. Based on the temperature information detected by the temperature detector 27, the control computer C controls supply of electricity to the electric motor M by the inverter 26.

The control computer C is connected to and exchanges signals with an air-conditioner switch 28, a compartment temperature detector 29, and a compartment temperature setting device 30. When the air-conditioner switch 28 is ON, the control computer C controls current supplied from the inverter 26 based on the difference between a target compartment temperature set by the compartment temperature setting device 30 and the temperature detected by the compartment temperature detector 29.

FIG. 2 is a flowchart showing a program for controlling current supply to the coil 252 of the electric motor M. The control computer C executes the current supply control shown in the flowchart of FIG. 2. Hereafter, the current supply control executed by the control computer C will be explained.

The control computer C stands by until the air-conditioner switch 28 is turned ON and an activation command is sent to the control computer C (step S1). When receiving an activation command (YES at step S1), the control computer C reads information related to a temperature $\Theta x$ that has been detected by the temperature detector 27 prior to the activation of the electric motor M (step S2). The control computer C compares the detected temperature $\Theta x$ with a predetermined reference temperature $\Theta o$ (step S3). The reference temperature $\Theta o$ is set lower than a protection temperature for preventing the coil 252 from being burnt.

If the detected temperature $\Theta x$ is less than or equal to the reference temperature $\Theta o$ (NO at step S3), the control computer C executes a control of current supply (non-limiting control) for controlling the inverter 26, in which Imax is set as an upper limit value (limiting value) at step S4. Imax is a maximum value (maximum upper limit value) of the current that can be supplied to the coil 252. When the target compartment temperature and the detected temperature are largely different from each other, the current supply control (non-limiting control), in which the current value Imax can be supplied, is started.

The control computer C determines whether it has received an operation stopping command that accompanies turning OFF of the air-conditioner switch 28 (step S5). If the control computer C has not received an operation stopping command (NO at step S5), the control computer C proceeds to step S4 and continues the non-limiting control. If the control computer C has received an operation stopping command (YES at step S5), the control computer C stops the operation of the electric motor M (step S6). Accordingly, the operation of the electric scroll compressor 10 is stopped.

If the detected temperature $\Theta x$ that has been detected prior to the activation of the electric motor M is higher than the reference temperature $\Theta o$ (YES at step S3), the control computer C executes a control of current supply (limiting control) for controlling the inverter 26, in which Ao×Imax is set as an upper limit value (limiting value) at step S7. Ao is greater than 0, and less than 1. In this manner, the control computer C starts the current supply control in which the current value is less than or equal to the upper limit 10 value (limiting value) Ao×Imax. During the limitation operation, even if the difference between a target compartment temperature and a detected temperature is great, a current that is greater than or equal to Ao×Imax is not supplied to the coil 252. The horizontal axis in the graph of FIG. 1B represents time, and the vertical axis represents a coefficient A (A is greater than 0 and not more than 1), by which the maximum upper limit value Imax is multiplied. Line E1 represents an equation A=Ao, and line E2 represents an equation A=1.

The control computer C determines whether an elapsed time Tx from the start of the limiting control has reached a predetermined reference time To (step S8). If the elapsed time Tx has not reached the reference time To (NO at step S8), the control computer C determines whether it has received an operation stopping command that accompanies turning OFF of the air-conditioner switch 28 (step S9). If the control computer C has not received an operation stopping command (NO at step S9), the control computer C proceeds to step S7 and continues the limiting control. If the control computer C has received an operation stopping command (YES at step S9), the control computer C proceeds to step S6 and stops the operation of the electric scroll compressor 10.

When the elapsed time Tx reaches the reference time To (NO at step S8), the control computer C shifts from the limiting control in which Ao×Imax is set as the upper limit value (limiting value) to the non-limiting control in which the Imax is set as the upper limit value (step S4). If the control computer C has not received an operation stopping command (NO at step S5), the control computer C proceeds to step S4 and continues the non-limiting control. If the control computer C has received an operation stopping command (YES at step S5), the control computer C stops the operation of the electric scroll compressor 10 (step S6).

As described above, when temperature $\Theta x$ detected by the temperature detector 27 reaches the predetermined reference temperature $\Theta o$, the control computer C functions as a limiting section that executes the limiting control to limit the upper limit value of current supplied to the coil 252 to the limiting value Ao×Imax, which is less than the maximum upper limit value Imax.

The first embodiment provides the following advantages.

(1-1) The temperature about the coil 252 (the detected temperature $\Theta x$) prior to the activation of the electric scroll compressor 10, that is, prior to the activation of the electric motor M, has reached the reference temperature $\Theta o$, the upper limit value of the current supplied to the coil 252 is limited to the limiting value Ao×Imax, which is less than the maximum upper limit value Imax. Thus, the electric scroll compressor 10 is not stopped immediately after the activation. Further, by appropriately selecting the value of Ao, the temperature of the coil 252 is prevented from being increased during a period required for the circulation of the refrigerant to reach a section including the coil 252. That is, a temperature increase in the coil 252 is suppressed by limiting the current supplied to the coil 252 to be less than or equal to the limiting value Ao×Imax. When the circulation of refrigerant reaches the section including the coil 252, the refrigerant flowing through the motor housing 18 lowers the temperature of the coil 252. The temperature of the coil 252 is thus prevented from being excessively increased.

(1-2) The constant limiting value Ao×Imax (that is, Ao is constant) and the reference time To can be determined through experiments. For example, in an experiment, the temperature about the coil 252 prior to the activation of the electric scroll compressor 10 (the temperature detected by the temperature detector 27) is set to a highest possible temperature, and a current of the constant value Ao×Imax is supplied. If the temperature of the coil 252 is suppressed to a value less than or equal to a maximum safety temperature (protection temperature) when a current of a constant limiting value Ao×Imax is supplied, the limiting value Ao×Imax at the time is adopted.

Further, a time from the activation to when the circulation of refrigerant reaches all the sections may be adopted as the reference time To. In this manner, the limiting value Ao×Imax is easily defined (selected) through experiments in which the limiting value Ao×Imax is constant. That is, in a control in which the limiting value Ao×Imax is constant, it is easy to select a limiting value that suppress a temperature increase of the coil 252 to a value less than or equal to the maximum safety temperature. Also, a value of the reference time To is easily defined (selected) through experiments.

That is, in a control in which the limiting control is cancelled when the reference time To has elapsed from the start of the limiting control, it is easy to select a reference time for suppressing a temperature increase of the coil 252 to a value less than or equal to the maximum value of the safety temperature.

Further, in a period from the start of the limiting control to when the reference time To has elapsed, the limiting control with the limiting value Ao×Imax is continued. Therefore, compared to a case where a limiting value is gradually increased as in another embodiment described below, the temperature increase of the coil 252 is suppressed.

A second embodiment according to the present invention will now be described with reference to flowcharts of FIGS. 3 and 4. Although the hardware structure is the same as that of the first embodiment, control functions of a control computer C of the second embodiment are different from those of the first embodiment.

In the second embodiment, the process from step S1 to step S4 (YES at S1→S2→NO at S3→S4), and the process from step S1 to step S9 (YES at S1→S2 , YES at S3→S7→NO at S8→S9) are identical to those of the first embodiment. The process after step S4 is different from that in the first embodiment.

Figure 3:
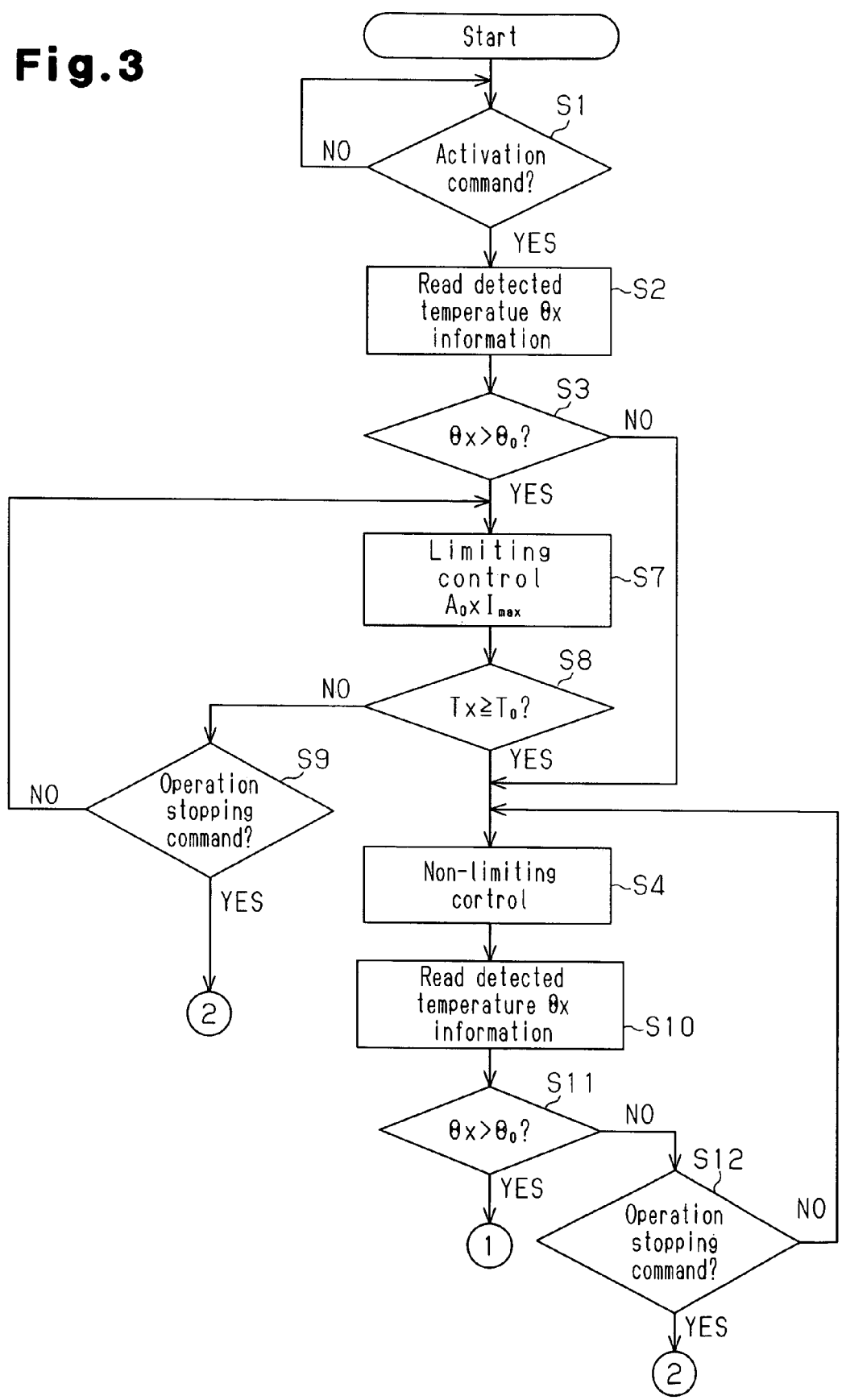
FIG. 3 is a flowchart showing a limiting control according to a second embodiment of the present invention.

As shown in FIG. 3, after step S4, the control computer C reads information related to a temperature Θ x detected by the temperature detector 27 (see FIG. 1A) at step S10. The control computer C compares the detected temperature Θ x with a predetermined reference temperature Θ o (step S11). If the detected temperature 8x is less than or equal to a reference temperature Θ o (NO at step S11), the control computer C determines whether it has received an operation stopping command that accompanies turning OFF of the air-conditioner switch 28 (see FIG. 1A) at step S12. If the control computer C has not received an operation stopping command (NO at step S12), the control computer C proceeds to step S4 and continues the non-limiting control. If the control computer C has received an operation stopping command (YES at step S12), the control computer C stops the operation of the electric scroll compressor 10 (step S19).

If the detected temperature Θ x is higher than the reference temperature Θ o (YES at step S11), the control computer C executes a current supply control (limiting control) for controlling the inverter 26, in which A1×Imax (A1≠Ao) is set as an upper limit value (step S13). A1 is, for example, greater than Ao, and less than 1.

Figure 4:
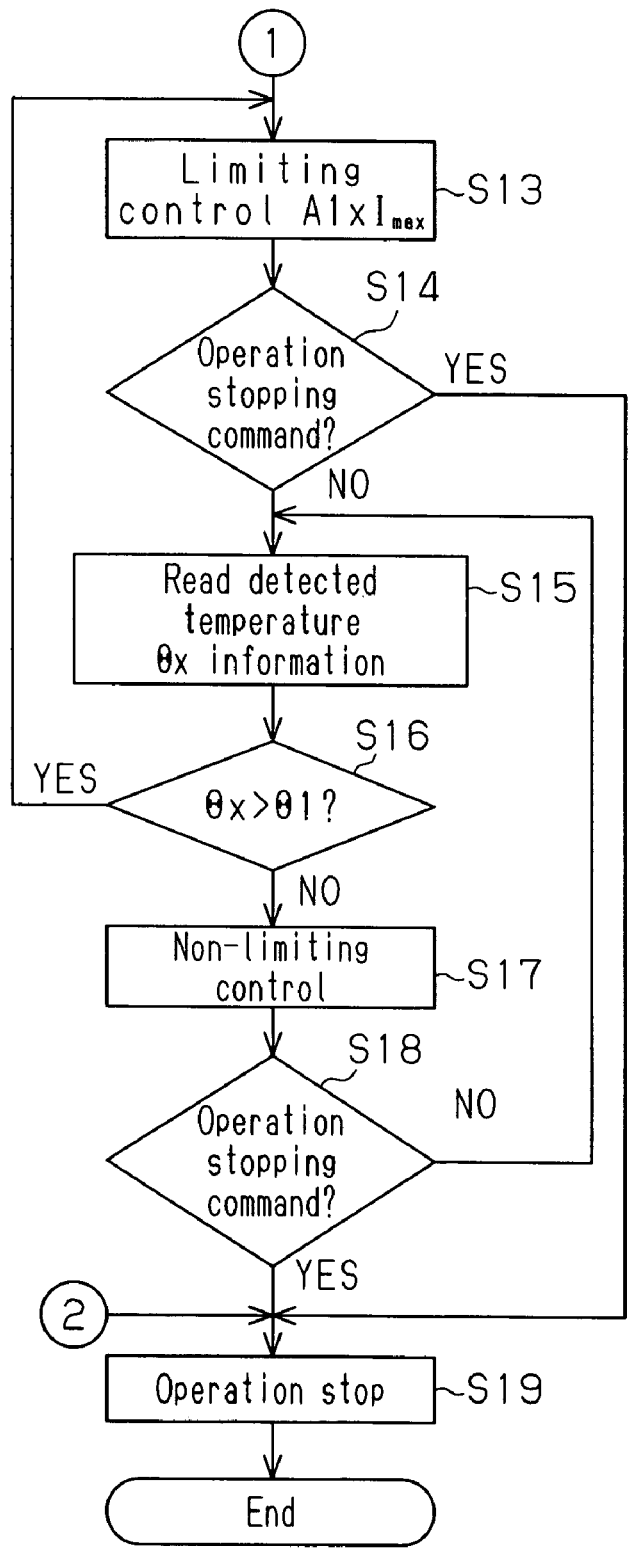
FIG. 4 is a flowchart that continues from FIG. 3.

As shown in FIG. 4, after step S13, the control computer C determines whether it has received an operation stopping command (step S14). If the control computer C has received an operation stopping command (YES at step S14), the control computer C stops the operation of the electric scroll compressor 10 (step S19). If the control computer C has not received an operation stopping command (NO at step S14), the control computer C reads the information of the detected temperature Θ x (step S15). The control computer C compares the detected temperature Θ x with a predetermined reference temperature Θ 1 (Θ 1≠Θ o) at step S16. Θ 1 is, for example, less than Θ o. When the detected temperature Θ x is higher than the reference temperature Θ1 (YES at step S16), the control computer C proceeds to step S13 and continues the limiting control in which the upper limit value is set to A1×Imax.

If the detected temperature Θ x is less than or equal to the reference temperature Θ 1 (NO at step S16), the control computer C shifts the control for controlling the inverter 26 from the limiting control, in which A1 Imax is set to the upper limit value, to a non-limiting control, in which Imax is set to the upper limit value (step S17). Then, the control computer C determines whether it has received an operation stopping command (step S18). If the control computer C has not received an operation stopping command (NO at step S18), the control computer C proceeds to step S15. If the control computer C has received an operation stopping command (YES at step S18), the control computer C stops the operation of the electric scroll compressor 10 (step S19).

In the second embodiment, the limiting control at the activation of the electric scroll compressor 10 (activation of the electric motor M) is the same as the first embodiment. However, in the operation after the activation, if the detected temperature Θ x surpasses the reference temperature Θ 1 (YES at step S16), the limiting control is executed at step S13. That is, the control computer C selects one of the limiting control and the non-limiting control not only at the activation but also in the operation after the activation based on the temperature about the coil 252 (step S16). Therefore, the coil 252 is prevented from excessively heated not only during the activation but also during the operation after the activation without stopping the operation.

The invention may be embodied in the following forms.

Figure 5:
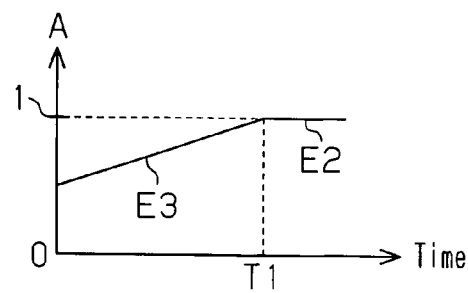
FIG. 5 is a graph showing a limiting control according to another embodiment of the present invention.

(1) As indicated by line E3 in FIG. 5, the coefficient A may be gradually increased from the start of the limiting control until it reaches 1 (A=1). In a control where the upper limit value A×Imax (limiting value) is increased from the start of the limiting control to when a predetermined reference time T1 (T1<To) has elapsed, the flow rate of refrigerant is increased. This rapidly lowers the temperature of the coil 252. Also, compared to a case where the coefficient A is constant, the efficiency of the electric compressor 10 is increased.

(2) It may be configured that the limiting control is executed at the activation as in the first embodiment, and the limiting control is executed in the operation after the activation as shown in FIG. 5.

Figure 6:
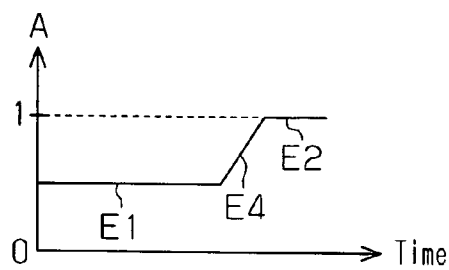
FIG. 6 is a graph showing a limiting control according-to a further embodiment of the present invention.

(3) As indicated by line E4 in FIG. 6, the limiting value may be increased only in part of the period from the start of the limiting control to when the predetermined reference time has elapsed.

Figure 7:
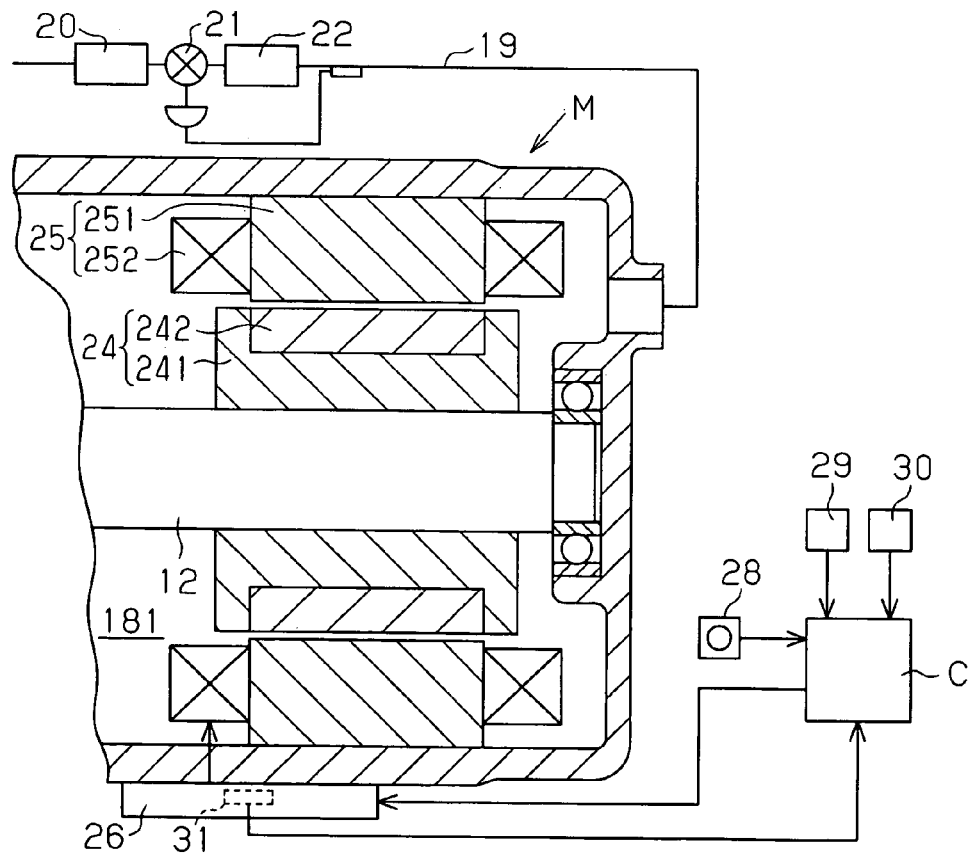
FIG. 7 is a partial side cross-sectional view illustrating an electric compressor having a temperature detection section different from that shown in FIG. 1A.

(4) As shown in FIG. 7, the inverter 26 is attached to the motor housing 18. A temperature detector 31 detects the temperature of the inverter 26 to prevent the inverter 26 from being excessively heated. The temperature detector 31 may detect the temperature about the coil 252 instead of the temperature detector 27. Based on the temperature detected by the temperature detector 31, the control computer C estimates the temperature of the coil 252 or the temperature about the coil 252 (the temperature of the refrigerant in the motor housing 18). If the estimated temperature exceeds the reference temperature Θ o, the limiting control is executed. Since the temperature about the coil 252 is detected by the temperature detector 31, which functions as a temperature detection section that detects the temperature of the inverter 26, the costs are reduced.

(5) The temperature detector may directly detect the temperature of the coil 252.

(6) The present invention may be applied to an electric piston compressor.

(7) The present invention may be applied to an electric variable displacement compressor.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

What is claimed:

1. A controller for an electric motor in an electric compressor, the compressor including a rotary shaft that is rotated by the electric motor and a compressing member that, based on rotation of the rotary shaft, compresses and discharges refrigerant in a compression chamber, a coil of the electric motor being cooled by the refrigerant, the controller controlling a current supplied to the coil within a range less than or equal to a predetermined maximum value, the controller comprising:

a temperature detection section detecting either a temperature of the coil or a temperature about the coil prior to activation of the electric motor; and a limiting section, wherein, when a detection temperature that is detected by the temperature detection section prior to activation of the electric motor reaches a predetermined first reference temperature, the limiting section executes a limiting control to limit an upper limit value of the current supplied to the coil to a limiting value that is less than the maximum value, wherein the limiting section cancels the limiting control after a reference time set in advance has elapsed since the start of the limiting control, wherein the temperature detection section continues detecting either the temperature of the coil or the temperature about the coil after the limiting control is cancelled, and wherein, if the detection temperature after the cancellation of the limiting control surpasses a second reference temperature set in advance, the limiting section executes the limiting control until the detection temperature becomes equal to the second reference temperature.

2. The controller according to claim 1,
wherein, while executing the limiting control, the limiting section maintains the limiting value to a constant value.

3. The controller according to claim 1,
wherein the limiting section increases the limiting value at least in a part of a period from the start of the limiting control to when a predetermined time set in advance has elapsed.

4. The controller according to claim 1,
wherein the reference time is determined based on the time required for the refrigerant to reach the coil since the activation of the electric compressor.

5. The controller according to claim 1,
wherein the temperature detection section is a first detection section that detects the temperature about the coil, and
wherein the controller includes an inverter that supplies a current to the electric motor, and a second temperature detection section that detects a temperature of the inverter, the second temperature detection section also functioning as the first temperature detection section.

* * * * *